United States Patent Office 3,206,522
Patented Sept. 14, 1965

---

3,206,522
PRODUCTION OF ALPHA-OLEFINS
Ronald L. Poe and Homer L. Hackett, Ponca City, Okla., Donald Monley Coyne, Prairie Village, Kans., and Wolf Rainer Kroll, Witten-Annen, Germany, assignors to Continental Oil Company, Ponca City, Okla., a corporation of Delaware
No Drawing. Filed July 6, 1960, Ser. No. 37,821
22 Claims. (Cl. 260—683.15)

This application is a continuation-in-part of co-pending application Serial No. 849,732, filed October 30, 1959, which is a continuation-in-part of co-pending application Serial No. 832,433, filed August 10, 1959, both of which are now abandoned.

This invention relates to a method for the preparation and recovery of alpha-olefins having a carbon content of at least 3 from ethylene. In one aspect, it relates to a process whereby the alpha-olefins so produced can be easily separated from the other components contained in the reaction mass. In another aspect, it relates to novel compositions employed in the separation process.

Heretofore, several methods have been proposed for the production of higher olefins from lower olefins. In general, these proposed methods have involved the reaction of a trialkyl-aluminum compound with a lower olefin, specifically, ethylene to form the so-called growth product. After forming the growth product, it is heated in the presence of an additional quantity of ethylene and a finely divided metal catalyst, such as finely divided nickel. Finally, the higher olefin is recovered from the reaction mass by distillation. The former reaction may be illustrated equationwise as follows:

(1)
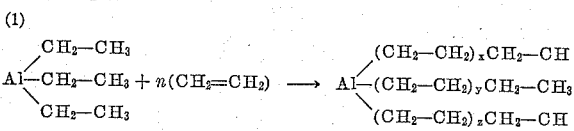

wherein $x$, $y$, and $z$ represent integers ranging from 0–14 (average 3–7) and $x+y+z=n$.

The foregoing reaction may be carried out by passing ethylene through triethylaluminum, preferably in the presence of a diluent under a wide variety of reaction conditions, e.g., 65°–150° C. and 200–5000 p.s.i.g., preferably 90°–120° C. and 1000–3500 p.s.i.g. It is to be understood that, instead of employing triethylaluminum as the starting trialkylaluminum in the above reaction, other low molecular weight alkyl ($C_2$–$C_4$) aluminum compounds such as tripropylaluminum, tributylaluminum, triisobutylaluminum, diethylaluminum hydride, ethylaluminum dihydride, etc., may be employed; and in lieu of ethylene, over low molecular weight aliphatic mono-1-olefins, such as propylene and the like may be substituted. Generally, $C_2$–$C_4$ olefins are preferred as the growth hydrocarbon compound.

The higher olefins are produced by heating growth product, usually at a temperature from about 50 to about 150° C. for 1 to 30 minutes in the presence of an adidtional quantity of ethylene and a catalyst, which process is known as the displacement reaction. The displacement reactions can be illustrated equationwise as follows:

(2) $Al(CH_2-CH_2-R)_3 + 3C_2H_4 \rightleftharpoons$
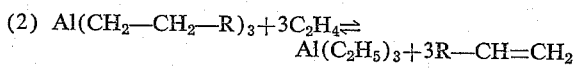
$Al(C_2H_5)_3 + 3R-CH=CH_2$ Wherein R=H, $C_2H_5$, $C_4H_9$, $C_6H_{13}$, etc.

It has been suggested that the alpha-olenfins and the triethylaluminum produced in the displacement reaction can be recovered by fractional distillation. It has been suggested further that, after the separation of the triethyl- aluminum and the alpha-olefins, the triethylaluminum can be returned to the growth reaction and the alpha-olefins to storage. The actual process, however, is not as simple as Equation 2 indicates. This is true, because the triethylaluminum and the alpha-olefins contained in the displacement products tend to undergo a reverse displacement reaction; and for that reason Equation 2 is written as a reversible reaction. Furthermore, under the conditions present, there is a tendency for the alpha-olefins to isomerize at atmospheric pressure. Investigations have demonstrated, conclusively, that the reverse displacement reaction and the tendency of the alpha-olefins to isomerize are both accelerated by the catalyst employed in the initial reaction.

In addition to the process difficulties outlined above, considerable difficulty is encountered in the separation of the different reaction or displacement components from each other by distillation. It has been found that, when triethylaluminum is reacted with ethylene and the resulting growth product is subjected to the displacement reaction, the reaction product will comprise in addition to the solvent the following components listed in order of ascending boiling points:

| | |
|---|---|
| Ethylene | Aluminum triethyl |
| Butene-1 | Tetradecene-1 |
| Hexene-1 | Hexadecene-1 |
| Octene-1 | Octadecene-1 |
| Decene-1 | Eicosene-1 |
| Dodecene-1 | Higher olefins; unreacted $AlR_3$ |

As a specific example, its impractial to separate triethylaluminum from dodecene-1 by ordinary methods of fractional distillation.

It is, therefore, a principal object of the present invention to provide a process of the production of alpha-olefins which obviates the disadvantage of the prior art processes.

It is another object of this invention to provide a process whereby alpha-olefins containing at least 3 carbon atoms can be produced from ethylene by a process which is economical and simple to operate.

Still another object of this invention is to provide a process for inhibiting the reversed displacement reaction in the production of alpha-olefins.

It is yet another object of this invention to provide a process whereby the alpha-olefins can be readily separated from the other components.

Still another object of this invention is to provide novel compositions of matter for use in the separation of alpha-olefins from other products of the displacement reaction.

Other objects and advantages of the invention will be apparent as the description proceeds.

To the accomplishment of the foregoing and related ends, this invention comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects are realized broadly by reacting the product of the displacement reaction comprising trialkyl-aluminum and alpha-olefins with a complexing agent, for example, alkali metal cyanide, to form a complex of said agent with trialkylaluminum and separating said complex from the alpha-olefins.

In one aspect of the invention, the complex which is formed between the complexing agent and trialkylaluminum compound is heated to release the trialkylaluminum compound, said compound being reused in the growth reaction and the complexing agent being recycled for reuse in the treatment of the displacement product.

In another aspect of the invention, an amount of alkali metal cyanide sufficient to inhibit isomerization of alpha-olefins and the reverse displacement reaction is added to the product of the displacement reaction.

In still another aspect, the invention comprises as new compositions of matter complexes of alkali metal cyanide with trialkylaluminum.

Suitable catalysts for use in the displacement reaction include the so-called reduction catalysts, such as nickel, cobalt, palladium, and certain iron compounds. The preferred catalyst is nickel or a nickel compound, which will react with the trialkylaluminum compound. As second choice, the catalyst is cobalt. Specific nickel catalysts include finely divided metallic nickel, Raney nickel, nickel acetylactonate, nickel naphthanate, etc. Karl Ziegler has designated such catalysts in his work on this subject, broadly, as "colloidal" nickel catalysts. The amount of catalyst used can be varied greatly; however usually the catalyst is employed in amounts from about 0.001 to 0.1 percent based upon the weight of the growth product present.

When employed, cyanides suitable for use as complexing agents include the alkali metal cyanides, especially sodium and potassium cyanides. Lithium cyanide is, of course, suitable. Because it is available at a rather economical price and in adequate quantities, sodium cyanide is preferred. The use of the alkali metal cyanide in the process is very important. It has been found that it not only reacts with the triethylaluminum substantially according to the following equations:

(3) $NaCN + 1.5Al(C_2H_5)_3 \rightarrow NaCN \cdot 1.5Al(C_2H_5)_3$ (4) $NaCN \cdot 1.5Al(C_2H_5)_3 + 0.5(Al(C_2H_5)_3$
$\rightarrow NaCN \cdot 2Al(C_2H_5)_3$ but it also acts as an effective poison to the reduction catalyst, the presence of which ordinarily promotes the reverse displacement and isomerization reactions.

Only small amounts of alkali metal cyanide are required to inhibit the reverse displacement reaction. Depending on the reducing catalyst employed, the quantity of alkali metal cyanide usually varies from about 5 to about 200 parts by weight per part by weight of catalyst. When the alkali metal cyanide is further employed in the process of separating the components of the displacement reaction, the amount of the alkali metal cyanide used should be sufficient to react with all of the triethylaluminum present as in Equation 3 or when the alkali metal cyanide-triethylaluminum complex is used the amount of complex to be added is determined from Equation 4. Generally, it is preferred to use the theoretical amount as shown by the equations.

Inhibition of the reverse displacement and isomerization reactions and formation of the alkali metal cyanide-trialkylaluminum complexes is usually at temperatures ranging from room temperature to about 150° C. In general, any temperature can be used, since the complexes are formed equally well at room temperature, as well as at more elevated temperatures. It is necessary, of course, that the temperature be maintained below the decomposition temperature of the complex. The complexes have variable solubility in solvents, for example, being more soluble in aromatic than in paraffinic compounds. Solubility of the complexes also varies with temperature. As a matter of preference, it is desirable that the complex be in the liquid state; therefore usually some degree of heating is employed, the quantity of heat added depending on the particular solvent which is used in the process. The time required to effect formation of the complex can vary widely but is usually from 1 to about 30 minutes. The complex compounds (cyanide-triethylaluminum complexes) and the alpha-olefins form separate layers, making it easy to remove the alpha-olefins by decanting or other similar means. If desired, the recovered alpha-olefins can be washed to remove any residual triethylaluminum that may be present in the recovered upper layer. Finally, the alpha-olefins can be subjected to fractional distillation. The complex salt can then be heated, bringing about its decomposition either to the 1.5:1 complex or to the alkali metal cyanide and the triethylaluminum. The thermal decomposition reactions can be illustrated as follows:

(5) $NaCN \cdot 2Al(C_2H_5)_3$
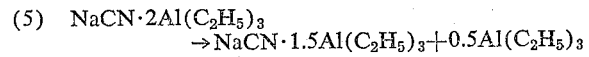
$\rightarrow NaCN \cdot 1.5Al(C_2H_5)_3 + 0.5Al(C_2H_5)_3$ (6) $NaCN \cdot 1.5Al(C_2H_5)_3 \rightarrow NaCN + 1.5Al(C_2H_5)_3$ It has been found that there is a direct relationship between the temperature at which the complex is heated to bring about its decomposition and the pressure. Specifically, if the pressure varies from 1 to 500 mm. of mercury, a suitable temperature range varies from about 100 to 200° C. Generally, it is preferred to operate under a pressure varying from 1 to 20 mm. of mercury and a tempreature varying from 120 to 180° C. As a rule, the temperature used is above the boiling point of the triethylaluminum at the particular pressure employed. Operating under such conditions makes it possible to remove the triethylaluminum as it is released from the complex causing the reaction to go to completion. As pointed out above, the alkali metal cyanide is very important in the process, as its use inhibits the reverse displacement and isomerization reactions; and as a consequence, the process is commercially attractive. Conversely stated, when the alkali metal cyanide is absent, the process is impractical.

From Equation 2, it will be seen that 3 moles of ethylene per mole of growth product is used. This, however, is the minimum, and as a rule an excess of ethylene is used. Under normal operating conditions, the reaction is generally carried out so that the process is maintained under an ethylene pressure of 20 to 100 atmospheres.

In addition to the procedure hereinbefore described, higher olefins can also be prepared from lower olefins through the reaction of an aluminum compound having the formula:

$$AlR_2OR'$$

with a lower olefin. This is accomplished by forming a growth product and displacing higher olefins from said growth product in the presence of additional lower olefin and a catalyst system comprising a reducing metal and an alkyl aluminum compound. When utilizing the alkoxy aluminum compound, the growth reaction takes place as follows:

(7) 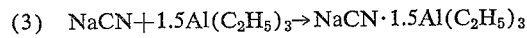
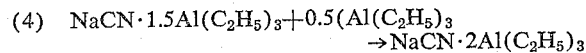

wherein $x$, $y$, and $z$ are defined as in reaction (1), R is a low molecular weight alkyl group, R' is a hydrocarbon group which can be alkyl, cycloalkyl, aryl, alkaryl, aralkyl, etc, and R and R' can be alike or unlike.

The higher olefins are produced by heating the growth product, under conditions of temperature and time as previously set forth, which process is known as the displacement reaction. This reaction can be illustrated equationwise as follows:

$Al(CH_2-CH_2R)_2OR' + 2C_2H_4$ 
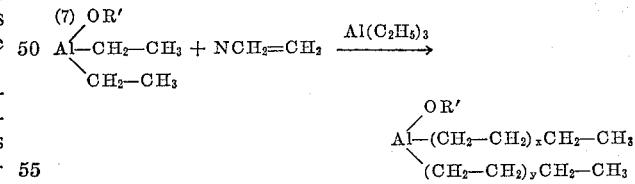

wherein R equals H, $C_2H_5$, $C_4H_9$, $C_6H_{13}$, etc. Treatment of the product of the displacement reaction, prepared in accordance with this method, can be inhibited through the use of alkali metal cyanide in the same manner as hereinbefore described. Similarly, the alkali metal cyanide can be employed to complex with the trialkylaluminum, thereby aiding in the separation and recovery of the alpha-olefin product. When the alkali metal cyanide is employed to complex the trialkylaluminum, the complex may form a separate lower layer from the olefins and alkoxy aluminum compound, depending on the particular solvent in which the reaction is carried out and also on the composition of the alkoxy compound. Various methods can be employed in recovering the alpha-olefins from the reaction product and complex mixture. For example, the olefins can be distilled until the boiling point of the alkoxy compound is reached, after which this compound can also be removed by distillation following which the complex can be decomposed, with recycling and reuse of the decomposed products as hereinbefore set forth. When the complex forms a separate lower layer, the alkoxy aluminum compound and olefins can be separated from the complex layer by decantation, with the complex being decomposed separately and the alkoxy compound and olefins being separated by distillation. In another variation of the recovery procedure, the olefins are distilled, followed by decomposition of the complex and finally distillation of the alkoxy compound. Each of the foregoing procedures find application by the appropriate choice of the OR′ group to provide an alkoxy compound having the desired boiling point.

It is also within the scope of the invention to employ in place of the aluminum alkoxy compounds materials having the formula:

$$AlR_2SR'$$

wherein R and R′ are defined as previously set forth.

While the preceding discussion has been directed to embodiments involving the use of alkali metal cyanides, it is to be understood that the invention is not limited thereto, and its is within the scope of the invention to employ broadly other complexing agents in the aforedescribed process. For example, trialkylaluminum compounds can also be complexed with ethers, thioethers, and tertiary amines. The ethers which are used are of the type R—O—R′, wherein R is an aromatic nucleus and R′ is either alkyl or aryl. Specific ethers include ethers such as diphenyl ether and benzyl ether, compounds such as alkoxynaphthalenes, anisole, substituted anisoles, and substituted phenetoles. The thioethers are of the same general type as the ethers and include the same types of specific compounds, for example, thiophene. The tertiary amines include those in which at least one radical is aromatic, the others being selected from alkyl, aryl, cycloalkyl, etc., groups, such as dimethyl aniline. Complexes are also produced through the reaction of mixed alkali metal cyanides with trialkylaluminums, having the general formula $Na_xK_y$ (n-trialkylaluminum CN), in which $x+y=1$ and $n=1.5$ to 2. These and other complexes are employed in the process in substantially the same manner and under the same conditions with respect to quantities, temperatures, etc., as the alkali metal cyanides. Certain of the complexes form separate phases from the olefins, while others do not, but are readily separable from the olefins by distillation. In some instances, the separation can be effected by a combination of both methods, e.g., in the manner previously described. It is, of course, within the scope of the invention to poison the displacement catalyst with alkali metal cyanide and utilize a different complexing agent to effect separation and recovery of the various components of the displacement reaction product.

A further understanding of the present invention will be obtained from the following examples which are intended to be illustrative but not limitative of the invention and the scope thereof.

Example 1

Growth product was prepared by reacting aluminum triethyl with ethylene at 100 atmospheres' pressure and 120° C. for 2½ hours. The resulting growth product had an "m" value of 3.6; that is, on the average 3.6 moles of ethylene were added between each aluminum ethyl bond.

A portion of this growth product, 1,330 grams plus 670 grams p-xylene, was used in the displacement reaction. The nickel concentration used in this displacement was 0.0013 weight percent added as nickel acetylacetonate (0.174 gram). This growth product with the catalyst was pumped into the displacement reactor where it was contacted with 100 percent excess ethylene, the reactor temperature being 112° C. and the reactor pressure 35 atmospheres. The residence time for the reaction was 2.25 minutes.

The displacement product from the above (2,140 grams) containing 265 grams of triethylaluminum was reacted with 65.5 grams of sodium cyanide at 120° C. Two liquid layers were formed, and the lower layer comprising $NaCN \cdot 2Al(C_2H_5)_3$ weighed 34 grams after the p-xylene solvent was stripped from the mixture. Since this weight was slightly greater than the total weight of triethylaluminum and sodium cyanide, the lower layer probably contained a small quantity of alpha-olefins. The top layer was substantially pure alpha-olefins (99 percent) after the removal of the solvent.

Example 2

The stripping process in Example 1 required a temperature of 120° C. at a pressure of 4 mm. of mercury. The total time for the stripping process was 8 hours. At this temperature and pressure, there was no gas (ethylene) evolved, indicating the complete absence of the reverse displacement reaction.

Example 3

In this example, the displacement product obtained by the same process as in Example 1, containing 0.1 percent nickel, was divided into two portions. To one portion was added a quantity of sodium cyanide in an amount equivalent to 100 parts per part of nickel. Both portions were then heated to a temperature of 100° C. for 1 hour. The results are summarized below:

| | Saturated [1] hydrocarbon mole percent | Analysis— alpha-olefin, mole percent | Beta Olefin, mole percent |
|---|---|---|---|
| At reactor exit (no heating) | 4.3 | 85.8 | 9.9 |
| Control (no NaCN) | 22.0 | 59.2 | 18.8 |
| NaCN added | 3.8 | 88.0 | 8.3 |

[1] Saturated hydrocarbons are formed upon hydrolysis of displacement product (from alkyl groups not displaced and from alkyl group formed by reverse displacement reaction).

The data given above show that, when no sodium cyanide is present, saturated hydrocarbons and beta olefins are produced at the expense of the alpha-olefins when the product is heated to 100° C. On the other hand, when sodium cyanide is present, the formation of additional quantities of either the saturated hydrocarbon or beta-olefin is prevented.

Example 4

171 grams of aluminum triethyl (1.5 moles) were added with stirring in an inert gas atmosphere (argon) to 49 grams (1 mole) of sodium cyanide which had been previously dried. The mixture was warmed up to 100° C. for an hour, after which all solid material had disappeared. In cooling down, the entire liquid crystallized to provide a material having a melting point of 52° C. Ananlysis of the crystals showed a ratio of sodium cyanide to aluminum triethyl of 1.54:1. When tested for solubility, the crystals dissolved in nonane in 110° C. in the ratio of 0.5 gram per 100 grams of nonane. The solubility in xylene was somewhat higher. Upon heating to 170° C. at 3 millimeters' pressure, the crystalline complex decomposed to aluminum triethyl and sodium cyanide.

Example 5

To 49 grams (1 mole) of sodium cyanide were added 228 grams of aluminum triethyl (2 moles) in the presence of argon. The mixture was stirred and heated to 100 to 120° C. for several hours. A clear liquid was formed in which the ratio of aluminum to sodium was 2:1. On standing at room temperature, the entire liquid crystallized, providing crystals having a melting point of 59° C. The crystals, when tested for solubility, were found to be substantially insoluble in aluminum triethyl. Solubility in nonane at 120° C. was about one gram per 100 grams of nonane, and the solubility in xylene was somewhat higher. Upon heating to 170° C. at 3 millimeters' pressure, decomposition took place, the result being formation of the sodium cyanide 1.5 aluminum triethyl complex and aluminum triethyl.

Example 6

51.5 grams of aluminum triethyl (0.45 mole) were added to 19.5 grams of potassium cyanide (0.3 mole) in an atmosphere of argon, and the mixture was warmed with stirring to 120° C. until all solid material disappeared. A clear liquid was obtained which, upon cooling, was entirely converted to solid crystals. The melting point of the crystals was determined to be 57° C. Analysis of the crystals showed a ratio of aluminum triethyl to potassium cyanide of 1.47:1. The crystals, when tested for solubility, were somewhat soluble in paraffins and more soluble in aromatic solvents. The crystals decomposed into potassium cyanide and aluminum triethyl at 200° C. and 0.5 millimeter pressure.

Example 7

A 250-milliliter, 3-necked glass flask containing argon was filled with 12 grams of potassium cyanide (0.184 mole). 44 grams of aluminum triethyl (0.368 mole) was added to the flask with stirring. The flask was then heated to 120° C. until the solids disappeared an a clear solution was obtained. On cooling, the liquid crystallized to provide crystals having a melting point of 78° C. When tested for solubility, the crystals were found to be substantially insoluble in aluminum triethyl. Similar to the previous compositions, the crystals were more soluble in aromatic solvents than in paraffins. On heating to 200° C. at 0.5 millimeter pressure, the crystals decomposed into the complex of Example 6 and aluminum triethyl.

Example 8

Charge:
　　211 grams of di-phenyl-ether (1.24 moles)
　　42 grams of aluminum triethyl (.368 m.)
　　39 grams of dodecene (.232 m.)

The above components were mixed and then distilled by a means of a two-foot stainless steel packed column at 10 mm. at 120–135° C. bath temperature. The main dodecene fraction was 35 grams, with an aluminum value of 2 percent containing about 7 percent of the total aluminum triethyl charge.

Decomposition of 1:1 etherate: 203 grams of etherate were decomposed at 10 mm. and 120–140° C. bath temperature. 77.25 grams of aluminum triethyl were regained in a main cut having the theoretical aluminum value and representing 95 percent of the charged aluminum triethyl.

Example 9

Charge:
　　141 grams of di-phenyl-sulfide (.756 m.)
　　41 grams of aluminum triethyl (.36 m.)
　　38 grams of dodecene (.226 m.)

A distillation similar to Example 8 was carried out by means of a two-foot column packed with glass helices, at about 5 mm. and 110–130° bath temperature. The main dodecene fraction was 34 grams, with an aluminum value of 1.9 percent containing only 6.6 percent of the total aluminum triethyl charge. The decomposition of the complex then was carried out at 130–160° C., and 4 mm.; 94 percent of the total aluminum triethyl was recovered.

Example 10

Charge:
　　221 grams of di-octa-decyl-sulfide (.41 m.)
　　41 grams of aluminum triethyl (.36 m.)
　　37 grams of dodecene (.22 m.)

Distillation of the dodecene was carried out at 4 mm. and at a bath temperature of 130–180° C. The main dodecene fraction (36 grams) contained only 3.7 percent of the total aluminum triethyl charge.

Example 11

(1) PREPARATION OF $Na_{0.5}K_{0.5}(2TEA \cdot CN)$ COMPLEX 24.5 grams of NaCN (0.5 mole)
　　32.5 grams of KCN (0.5 mole)
　　230.5 grams of aluminum triethyl (2.02 moles)

The mixture was warmed up to 80° under stirring. On cooling, a melting point of 52–54° was obtained, which was confirmed by remelting. (The melting point of the 1:2 sodium cyanide complex is about 59°, while that of the corresponding potassium cyanide complex is about 78° C.)

65 grams complex were stirred with 50 ml. of hexane at 70°. After settling and cooling overnight, the top layer was decanted and analyzed: 0.12 percent Al. This procedure was repeated with the same complex; an aluminum value of 0.11 percent was obtained.

66 grams complex were stirred with 50 ml. dodecene-1 at 80°. After settling and cooling overnight, the top layer was decanted and analyzed: 0.72 percent Al. This procedure was repeated and gave an Al-value of 0.64 percent Al. (For comparison, the corresponding value obtained with the $NaCN \cdot 2TEA$ complex was 0.86 percent Al.)

Example 12

In 1.5 hours, 60 grams 1:2 complex of Example 11 were decomposed to the 1:1.5 complex at a bath temperature of 160–200° at 4.5 mm. About 10 grams of distillate were obtained which were practically pure TEA, while the residue (50 grams) was clear liquid at higher temperatures.

This indicates that the decompositon of the mixed complex occurs in the same range as with the sodium cyanide complex.

While particular embodiments of our invention have been described, it will be understood, of course, that the invention is not limited thereto, since many modifications may be made; and it is, therefore, contemplated to cover by the appended claims any such modifications as fall within the true spirit and scope of the invention. As will be apparent to those skilled in the art, the invention is applicable to the production of even-numbered and odd-numbered and straight-chain and branched-chain alpha-olefins. Even-numbered alpha-olefins are produced when triethylaluminum is reacted with ethylene after which the resulting growth product is treated in accordance to our invention. Odd-numbered alpha-olefins are produced when tripropylaluminum is substituted for triethylaluminum in the reaction. It will be obvious to those skilled in the art that the alpha-olefins can be recovered from the other components by other methods in addition to distillation. One other method, by way of example, is solvent extraction. For example, a selective solvent, such as pentane, is very effective for the recovery of alpha-olefins. Other variations in procedure which can be used within the scope of the invention include stripping of lower olefins and solvent from the displacement product either before or after treatment of said product to form the trialkylaluminum complex; washing the separated complexes free of alpha-olefins with a solvent; separating the complex layers from the alpha-olefins by crystallization followed by filtration or centrifugation; etc. It is also within the scope of the invention to prepare the 1.5:1 cyanide complex from 2:1 complex in accordance with the following reaction:

(9) $3NaCN \cdot 2Al(C_2H_5)_3 + NaCN \rightarrow$
$4NaCN \cdot 1.5Al(C_2H_5)_3$ The complex compounds of the alkali metal cyanides and trialkylaluminum provide a number of advantages in the process of this invention. Under the conditions of the process, the complexes are liquid and thus are more easily handled than the alkali metal cyanides which are solids.

As pointed out previously, it is within the scope of the invention to poison the displacement catalyst with alkali metal cyanide and utilize a different complexing agent to effect separation and recovery of the various components of the displacement reaction product. It is also within the scope of the invention to employ other materials or agents which are capable of poisoning the displacement catalyst, prior to the use of the various complexing agents, including the alkali metal cyanides. For example, the catalyst can be poisoned by the addition of acetylenic compounds such as phenyl acetate as dissolved in German Patent No. 1,034,169 to Karl Zeigler. In addition, acetylene alcohols, such as propargyl alcohols, can be used to poison the catalyst, that is, to inhibit the reverse displacement reaction and also isomerization reactions.

The invention having thus been described, what is claimed and desired to be secured by Letters Patent is:

1. In a process for the preparation of alpha-olefins having a carbon content of at least three in which a material selected from the group consisting of $AlR_3$, $AlR_2OR' + AlR_3$, and $AlR_2SR' + AlR_3$, in which R is a low molecular weight alkyl group, R' is a hydrocarbon group, and R and R' can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a reverse displacement reaction and isomerization inhibiting amount of alkali metal cyanide.

2. The process of claim 1 in which the alkali metal cyanide is sodium cyanide.

3. The process of claim 2 in which the material reacted with the low molecular weight aliphatic mono-1-olefin is trialkylaluminum, said 1-olefin is ethylene and the amount of sodium cyanide is between about 5 and about 200 parts by weight per part of nickel catalyst.

4. The process of claim 3 in which the displacement product and alkali metal cyanide are heated at a temperature up to about 150° C. for 1 to 30 minutes.

5. In a process for the preparation of alpha-olefins having a carbon content of at least three in which a material selected from the group consisting of $AlR_3$, $AlR_2OR' + AlR_3$, and $AlR_2SR' + AlR_3$, in which R is a low molecular weight alkyl group, R' is a hydrocarbon group and R and R' can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a complexing agent for $AlR_3$ selected from the group consisting of alkali metal cyanides, complex of alkali metal cyanide with $AlR_3$ in which the molecular ratio of $AlR_3$ to said alkali metal cyanide is 1.5:1 and mixed alkali metal cyanides, said complexing agent being present in an amount sufficient to react with and form a complex with substantially all of the $AlR_3$ in said displacement product and recovering alpha-olefins from said complex.

6. The process of claim 5 in which the material reacted with the low molecular weight aliphatic mono-1-olefin is triethylaluminum and said 1-olefin is ethylene.

7. The process of claim 6 in which the complexing agent is alkali metal cyanide.

8. The process of claim 7 in which the alkali metal cyanide is sodium cyanide.

9. In a process for the preparation of alpha-olefins having a carbon content of at least three in which a material selected from the group consisting of $AlR_3$, $AlR_2OR' + AlR_3$, and $AlR_2SR' + AlR_3$, in which R is a low molecular weight alkyl group, R' is a hydrocarbon group and R and R' can be alike and unlike, is reacted with a low molecular weight aliphatic mono-1-olefin to provide a growth product, said growth product is heated in the presence of a nickel reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with and form a complex with substantially all of the $AlR_3$ present in said displacement product, allowing the resulting reaction product to separate into two layers, an upper layer comprising materials selected from the group consisting of alpha-olefins, $AlR_2OR'$+alpha-olefins, and $AlR_2SR'$+alpha-olefins, and the lower layer comprising alkali metal cyanide-$AlR_3$ complex wherein the molecular ratio of said $AlR_3$ to said alkali metal cyanide varies from 1.5:1 to 2:1, separating the upper layer and recovering the alpha-olefins therefrom.

10. The process of claim 9 in which the alkali metal is sodium cyanide, the material reacted with the low molecular weight aliphatic mono-1-olefin is triethylaluminum and said 1-olefin is ethylene.

11. In a process for the preparation of alpha-olefins having a carbon content of at least three in which a trialkylaluminum compound is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with substantially all of the $AlR_3$, allowing the resulting reaction product to separate into two layers, an upper layer comprising the alpha-olefins and the lower layer comprising alkali metal cyanide-$AlR_3$ complex wherein the molecular ratio of said $AlR_3$ to said alkali metal cyanide varies from 1.5:1 to 2:1, separating the upper layer and recovering the alpha-olefins therefrom, heating said lower layer to decompose at least a portion of said alkali metal cyanide $AlR_3$ complex, separating released $AlR_3$ compound and returning said compound to the growth reaction and recycling undecomposed alkali metal cyanide-$AlR_3$ complex and alkali metal cyanide for reuse in the process.

12. The process of claim 11 in which the alkali metal is sodium cyanide, the material reacted with the low molecular weight aliphatic mono-1-olefin is triethylaluminum and said 1-olefin is ethylene.

13. In a process for the preparation of alpha-olefins having a carbon content of at least three in which a trialkylaluminum compound is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with and form a complex with substantially all of the $AlR_3$ present in said displacement product, allowing the resulting reaction product to separate into two layers, an upper layer comprising the alpha-olefins and the lower layer comprising alkali metal cyanide-AlR$_3$ complex wherein the molecular ratio of said AlR$_3$ to said alkali metal cyanide varies from 1.5:1 to 2:1, separating the upper layer and recovering the alpha-olefins therefrom, heating said lower layer to decompose said alkali metal cyanide-AlR$_3$ complex to release AlR$_3$ and form alkali metal cyanide and 1.5:1 complex of AlR$_3$ with alkali metal cyanide, separating released AlR$_3$ compound and returning said compound to the growth reaction and recycling alkali metal cyanide and said 1.5:1 complex for reuse in the process.

14. The process of claim 13 in which the alkali metal is sodium cyanide, the material reacted with the low molecular weight aliphatic mono-1-olefin is triethylaluminum and said 1-olefin is ethylene.

15. In a process for the preparation of alpha-olefins having a carbon content of at least 3 in which a material selected from the group consisting of AlR$_3$,

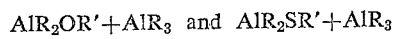
AlR$_2$OR′ + AlR$_3$ and AlR$_2$SR′ + AlR$_3$ in which R is a low molecular weight alkyl group, R′ is a hydrocarbon group and R and R′ can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with and form a complex with substantially all of the AlR$_3$ in said displacement product, thereby providing a product comprising alpha-olefins, said compound selected from the group consisting of AlR$_2$OR′ and AlR$_2$SR′ as appropriate, and alkali metal cyanide-AlR$_3$ complex wherein the molecular ratio of said AlR$_3$ to said alkali metal cyanide varies from 1.5:1 to 2:1, and separating alpha-olefins from said displacement product.

16. The process of claim 15 in which the alkali metal is sodium cyanide, the material reacted with the low molecular weight aliphatic mono-1-olefin is triethylaluminum and said 1-olefin is ethylene.

17. In a process for the preparation of alpha-olefins having a carbon content of at least 3 in which a material selected from the group consisting of AlR$_3$, AlR$_2$OR′ + AlR$_3$ and AlR$_2$SR′ + AlR$_3$ in which R is a low molecular weight alkyl group, R′ is a hydrocarbon group and R and R′ can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with and form a complex with substantially all of the AlR$_3$ in said displacement product, thereby providing a product comprising alpha-olefins, said compound selected from the group consisting of AlR$_2$OR′ and AlR$_2$SR′ as appropriate, and alkali metal cyanide-AlR$_3$ complex wherein the molecular ratio of said AlR$_3$ to said alkali metal cyanide varies from 1.5:1 to 2:1, distilling alpha-olefins from said displacement product, thereafter distilling from said displacement product said material selected from the group consisting of AlR$_2$OR′ and AlR$_2$SR′ and recycling said material for reuse in the process, heating to decompose at least a portion of said alkali metal cyanide-AlR$_3$ complex and recycling released AlR$_3$, alkali metal cyanide and undecomposed alkali metal cyanide-AlR$_3$ complex for reuse in the process.

18. The process of claim 17 in which the alkali metal is sodium cyanide, AlR$_3$ of the material reacted with the low molecular weight aliphatic mono-1-olefin is triethylaluminum and said 1-olefin is ethylene.

19. In a process for the preparation of alpha-olefins having a carbon content of at least 3 in which a material selected from the group consisting of AlR$_3$,

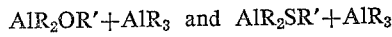
AlR$_2$OR′ + AlR$_3$ and AlR$_2$SR′ + AlR$_3$ in which R is a low molecular weight alkyl group, R′ is a hydrocarbon group and R and R′ can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with substantially all of the AlR$_3$ in said displacement product, thereby providing a product comprising alpha-olefins, said compound selected from the group consisting of AlR$_2$OR$_2$ and AlR$_2$SR′ as appropriate, and alkali metal cyanide-AlR$_3$ complex wherein the molecular ratio of said AlR$_3$ to said alkali metal cyanide varies from 1.5:1 to 2:1, separating alpha-olefins from the displacement product by distillation, heating to decompose at least a portion of said alkali metal cyanide-AlR$_3$ complex, recovering said compound selected from the group consisting of AlR$_2$OR′ and AlR$_2$SR′ by distillation and recycling AlR$_3$, alkali metal cyanide, undecomposed alkali metal cyanide-AlR$_3$ complex and said compound selected from the group consisting of AlR$_2$OR′ and AlR$_2$SR′ for reuse in the process.

20. The process of claim 19 in which the alkali metal is sodium cyanide, AlR$_3$ of the material reacted with the low molecular weight aliphatic mono-1-olefin is triethylaluminum and said 1-olefin is ethylene.

21. In a process for the preparation of alpha-olefins having a carbon content of at least 3 in which a material selected from the group consisting of AlR$_3$,

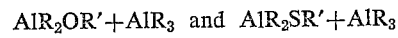
AlR$_2$OR′ + AlR$_3$ and AlR$_2$SR′ + AlR$_3$ in which R is a low molecular weight alkyl group, R′ is a hydrocarbon group and R and R′ can be alike and unlike, is reacted with a low molecular weight aliphatic mono-1-olefin to provide a growth product, said growth product is heated in the presence of a nickel metal reducing catalyst and an additional amount of said low molecular weight aliphatic mono-1-olefin to provide a displacement product, the improvement which comprises adding to said displacement product a compound comprising alkali metal cyanide, said compound being present in an amount sufficient to react with and form a complex with substantially all of the AlR$_3$ in said displacement product, allowing the resulting reaction product to separate into two layers, an upper layer comprising alpha-olefins and said compound selected from the group consisting of AlR$_2$OR′ and AlR$_2$SR′ as appropriate, and the lower layer comprising alkali metal cyanide-AlR$_3$ complex wherein the molecular ratio of said AlR$_3$ to said alkali metal cyanide varies from 1.5:1 to 2:1, separating the upper layer and recovering the alpha-olefins therefrom by distillation, recycling said compound selected from the group consisting of AlR$_2$OR′ and AlR$_2$SR′ for reuse in the process, heating said lower layer to decompose at least a portion of said alkali metal cyanide-AlR$_3$ complex and recycling released AlR$_3$, alkali metal cyanide and undecomposed alkali metal cyanide-AlR$_3$ complex for reuse in the process.

22. The process of claim 21 in which the alkali metal is sodium cyanide, AlR$_3$ of the material reacted with the low molecular weight aliphatic mono-1-olefin is triethylaluminum and said 1-olefin is ethylene.

(References on following page)

References Cited by the Examiner

UNITED STATES PATENTS

| | | | |
|---|---|---|---|
| 2,781,410 | 2/57 | Ziegler et al. | 260—683.15 |
| 2,849,349 | 8/58 | Ziegler et al. | 260—448 |
| 2,872,470 | 2/59 | Reed et al. | 260—448 |
| 2,923,725 | 2/60 | Nowlin | 260—448 |
| 2,969,408 | 1/61 | Nowlin et al. | 260—683.15 |
| 3,088,957 | 5/63 | McKay | 260—448 |

FOREIGN PATENTS 763,824   12/56   Great Britain.

OTHER REFERENCES

Duck: Thesis published July 27, 1956, at Technische Hachschule of Aachen, Germany, 12, pp (translation of a portion available in 260–683.15).

ALPHONSO D. SULLIVAN, *Primary Examiner.*

MILTON STERMAN, JOSEPH R. LIBERMAN,
*Examiners.*

UNITED STATES PATENT OFFICE
CERTIFICATE OF CORRECTION

Patent No. 3,206,522                      September 14, 1965

Ronald L. Poe et al.

It is hereby certified that error appears in the above numbered patent requiring correction and that the said Letters Patent should read as corrected below.

Column 1, lines 36 to 40, the right-hand portion of equation (1) should appear as shown below instead of as in the patent:

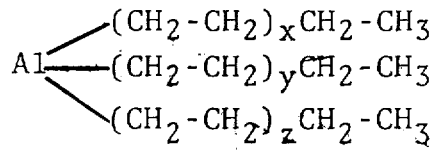

same column 1, line 54, for "over" read -- other --; column 2, line 36, for "of", first occurrence, read -- for --;column 3, line 15, for "acetylactonate" read -- acetylacetonate --; lines 32 to 34, equation (4), after "0.5" strike out the opening parenthesis; column 4, lines 65 to 67, equation (8) should appear as shown below instead of as in the patent:

(8)

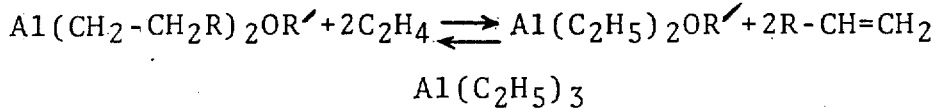

column 5, line 34, for "its" read -- it --; column 9, line 23, for "acetate as dissolved" read -- acetylene as disclosed --; column 12, line 23, for "AlR$_2$OR$_2$" read -- AlR$_2$OR′ --.

Signed and sealed this 26th day of April 1966.

(SEAL)
Attest:

ERNEST W. SWIDER                      EDWARD J. BRENNER
Attesting Officer                     Commissioner of Patents